(12) United States Patent
Harris

(10) Patent No.: US 7,618,563 B2
(45) Date of Patent: Nov. 17, 2009

(54) REDUCED FLAMMABILITY PLASTIC FORMULATION AND METHOD

(75) Inventor: John N. Harris, Seattle, WA (US)

(73) Assignee: The Boeing Company, Chicago, IL (US)

(*) Notice: Subject to any disclaimer, the term of this patent is extended or adjusted under 35 U.S.C. 154(b) by 558 days.

(21) Appl. No.: 11/252,592

(22) Filed: Oct. 19, 2005

(65) Prior Publication Data

US 2007/0085064 A1   Apr. 19, 2007

(51) Int. Cl.
| | |
|---|---|
| C08K 5/521 | (2006.01) |
| C08K 5/49 | (2006.01) |
| C08K 3/32 | (2006.01) |
| A62C 2/06 | (2006.01) |
| C09K 21/04 | (2006.01) |
| C09K 21/08 | (2006.01) |
| C09K 5/18 | (2006.01) |

(52) U.S. Cl. ............ 252/606; 252/602; 252/609; 524/115; 524/140; 524/145; 524/121; 524/386; 524/416; 524/492; 524/464

(58) Field of Classification Search .......... 252/606, 252/609; 524/464
See application file for complete search history.

(56) References Cited

U.S. PATENT DOCUMENTS

| 5,681,640 A | 10/1997 | Kiser |
| 5,723,515 A | 3/1998 | Gottfried |
| 6,930,138 B2* | 8/2005 | Schell et al. ............. 524/145 |
| 7,331,400 B2* | 2/2008 | Rowen ................. 169/45 |

FOREIGN PATENT DOCUMENTS

| EP | 0 857 110 B1 | 10/2005 |
| WO | WO 97/15444 A1 | 5/1997 |

* cited by examiner

*Primary Examiner*—Harold Pyon
*Assistant Examiner*—Timothy Chiang

(57) ABSTRACT

A fire-retardant coating material includes an intumescent material and a binder. The intumescent material is cured and powdered. The intumescent material includes a hydrocarbon, acid source and blowing agent. The hydrocarbon includes a plurality of alcohol groups. The fire-retardant coating material dries at room temperature.

8 Claims, 2 Drawing Sheets

REDUCED FLAMMABILITY PLASTIC FORMULATION AND METHOD

FIELD OF THE INVENTION

The present invention generally relates to a plastic having reduced flammability characteristics. More particularly, the present invention pertains to a plastic surface coating having intumescent properties and formulation thereof.

BACKGROUND OF THE INVENTION

In various manufacturing and construction industries, items are produced that benefit from a surface coating or primer. Typically, these coatings provide some protection for the underlying surface or facilitate the adhesion of subsequent coatings such as paint. Metal or reactive surfaces, are typically coated or chemically altered to reduce reactivity and thereby reduce corrosion or oxidation. Coatings may include colorants to alter visual aspects of items coated.

In addition, flame retardant coatings may reduce the flammability of items coated. For example, parts of vehicles, buildings, and furniture may be coated with flame retardant coatings to reduce their flammability. Unfortunately, conventional flame retardant coatings may be dissolved and rendered inactive by water or water vapor or require elevated cure temperatures and extended cure times. Susceptibility to water may be reduced by coating the flame retardant layer with a water impervious layer. However, this added step increases cost and is time consuming. The curing requirements are costly, time consuming and may also be impractical for large items such as, for example, buildings, planes, trains, and the like.

Accordingly, it is desirable to provide a coating capable of overcoming the disadvantages described herein at least to some extent.

SUMMARY OF THE INVENTION

The foregoing needs are met, to a great extent, by the present invention, wherein in one respect a surface coating and formulation thereof is provided.

An embodiment of the present invention pertains to a fire-retardant coating material including an intumescent material and a binder. The intumescent material is cured and powdered. The intumescent material includes a hydrocarbon, acid source and blowing agent. The hydrocarbon includes a plurality of alcohol groups. The fire-retardant coating material dries at room temperature.

Another embodiment of the present invention relates to an apparatus for producing a fire-retardant solution for coating an item. The apparatus includes a means for curing an intumescent material, means for grinding the cured intumescent material into a powder, and means for mixing the powder in a binder to produce the fire-retardant solution.

Yet another embodiment of the present invention pertains to an apparatus for coating an item with a fire-retardant coating. The apparatus includes a means for applying a fire-retardant coating and a means for drying the fire-retardant coating at room temperature for a predetermined amount of time. The fire retardant coating includes an intumescent material and a binder. The intumescent material is cured and powdered. The intumescent material includes a hydrocarbon, acid source and blowing agent. The hydrocarbon includes a plurality of alcohol groups. The fire-retardant coating material dries at room temperature.

Yet another embodiment of the present invention relates to a method of producing a fire-retardant solution for coating an item. In this method, an intumescent material is cured, the cured intumescent material is ground into a powder, and the powder is mixed in a binder to produce the fire-retardant solution.

Yet another embodiment of the present invention pertains to a method of coating an item with a fire-retardant coating. In this method, a fire-retardant coating is applied and the fire-retardant coating is dried at room temperature for a predetermined amount of time. The fire retardant coating includes an intumescent material and a binder. The intumescent material is cured and powdered. The intumescent material includes a hydrocarbon, acid source and blowing agent. The hydrocarbon includes a plurality of alcohol groups. The fire-retardant coating material dries at room temperature.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The present invention provides a surface coating and formulation thereof that includes an intumescent material. Intumescent materials are a class of materials that swell up into a carbonaceous char and a glassy layer in the presence of heat or flame. These carbonaceous char and glassy layers provide a thermally protective layer for any underlying surface. In an example of a preferred embodiment, the intumescent material includes three components: (1) a hydrocarbon with a plurality alcohol groups (e.g., OHCH2—CH2—CH—OH— . . . ); (2) a source of acid, such as, phosphoric acid and the like); and (3)

a blowing agent. Blowing agents include a class of materials that dissociates at high temperatures to give off gases such as nitrogen and carbon dioxide. When a threshold temperature is reached the acid is released, which reacts with the alcohol groups to produce water. The water is released along with the gases when the blowing agent is set off by the predetermined threshold temperature. The evaporation of water is an endothermic process that cools the surroundings and reduces flame propagation. Typically, water is not readily incorporated into plastics. It is an advantage of embodiments of the invention that intumescent materials that generate water as a by product of the temperature driven reaction may be incorporated into plastic coatings.

It is another advantage of embodiments that intumescent material, which are typically sensitive to water, may be made water resistant by encapsulation in a waterproof binder. Thus prepared, the intumescent materials may be incorporated into water and moisture resistant coatings. In an embodiment, the intumescent material is cured prior to being introduced to a carrier solution or coating binder. This pre-cured intumescent material may be ground into a powder such that, when added to the coating binder, the average particle size is sufficiently small enough so as to remain in suspension for a suitable period of time. Suitable suspension periods include a few seconds to a year or more. For example, in a dispensing system that includes continuous agitation, a suspension period of a few seconds may be sufficient. More preferably, the pre-cured intumescent material is ground to an average particle size that results in a suspension time of a day or more.

It is yet another advantage of embodiments that intumescent material with endothermic properties may be incorporated into coatings that are relatively less abrasive than conventional intumescent coatings. For example, the dye, aluminum oxide trihydrate, is conventionally used to evolve water in response to fire. Unfortunately, aluminum oxide trihydrate is highly abrasive to dispensing equipment. In contrast, intumescent material according to embodiments of the invention are relatively less abrasive.

Figure 1:
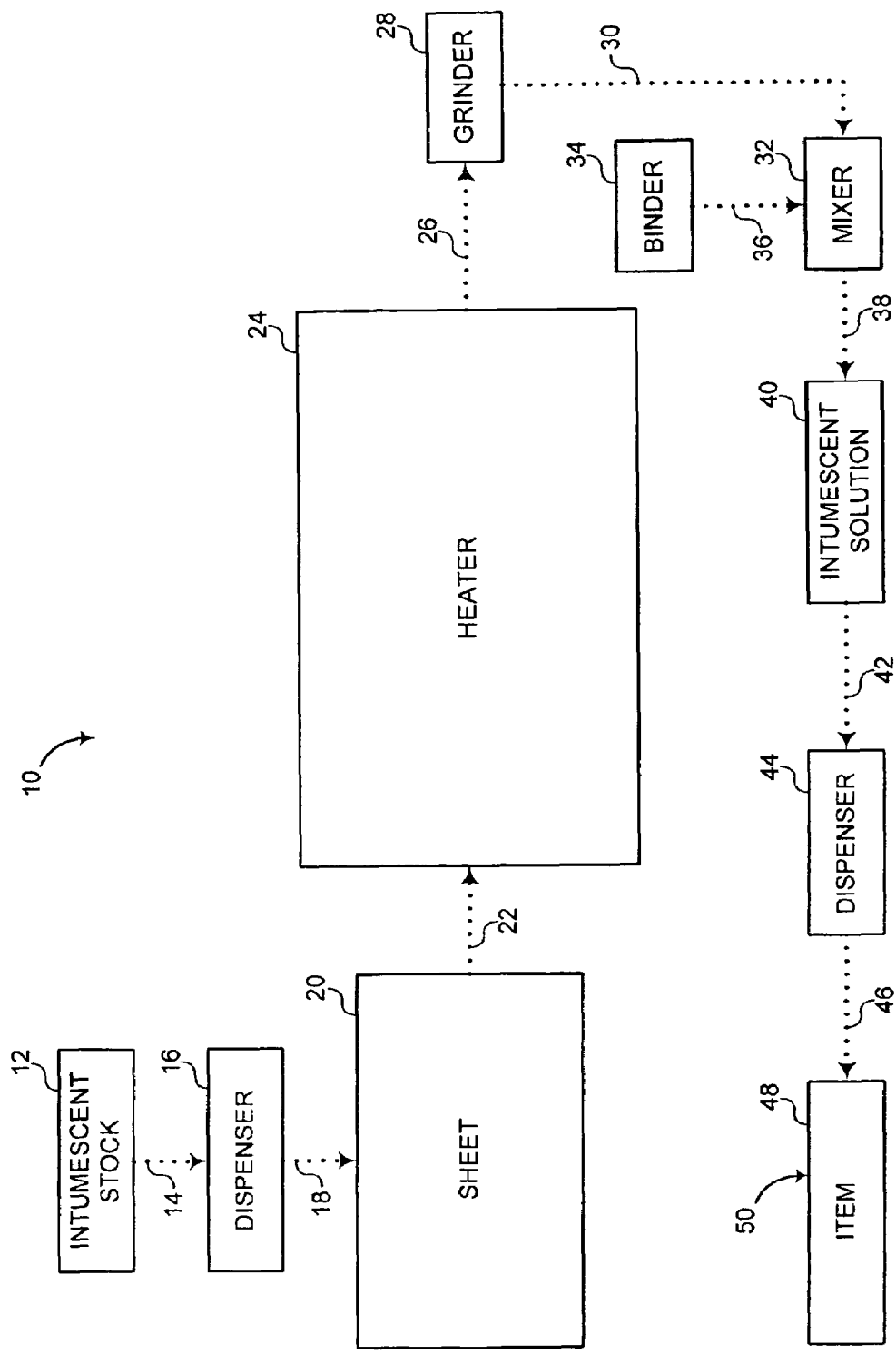
FIG. 1 is a block diagram of a system for producing an intumescent solution and applying the solution to an item in accordance with an embodiment of the invention.

Preferred embodiments of the invention will now be described with reference to the drawing figures, in which like reference numerals refer to like parts throughout. FIG. 1 is a block diagram of a system 10 for producing an intumescent solution and applying the solution to an item. As shown in FIG. 1, the system 10 includes an intumescent stock 12 that is placed 14 in a dispenser 16 and applied 18 to a sheet 20. In this manner, the intumescent stock 12 is prepared for subsequent curing steps. The intumescent stock 12 may include any suitable intumescent material. Suitable examples of intumescent materials may include a hydrocarbon with a plurality alcohol groups a source of acid, and a blowing agent. Suitable hydrocarbons include epoxide-based, melamine-based, various polyols, and the like. Suitable acid sources include phosphates, carbonates, nitrates, and the like. Suitable blowing agents generally include any compound capable of dissociating at a predetermined temperature. More particularly, suitable blowing agents include those compounds capable of evolving gaseous nitrogen, carbon dioxide, and/or the like. Particular examples of suitable intumescent materials include, at least, product FX-100 and other intumescent materials manufactured by Flame Seal Products, INC. of Houston, Tex., USA.

The dispenser 16 includes any suitable device or process to apply 18 the intumescent stock 12 to the sheet stock 20 in a relatively thin layer or film. Examples of suitable dispensers include paint sprayers, brushes, rollers, and the like. A suitable process may include pouring the intumescent stock 12 on the sheet stock 20.

The sheet 20 includes any substantially flat material capable of being heated to a curing temperature of the intumescent stock 12. It is preferable that the sheet 20 not contaminate the intumescent stock 12 and that the intumescent 12 is easily removable from the sheet 20 following the curing process.

The sheet 20 coated with the intumescent stock 12 is placed 22 in a heater 24 and cured at a predetermined temperature for a predetermined amount of time. The heater 24 includes any suitable device operable to raise the temperature of the intumescent stock 12 to the predetermined cutting temperature for the predetermined amount of time. Specific examples of suitable heaters include dry air ovens, heat lamps, hot plates, and the like. With regard to the curing time and temperature, specific curing times and temperatures are dependent upon the particular formula of the intumescent stock 12, manufacturers instructions, and the like. In a particular example, a 180 minute curing time at 110° F. (43.33° C.) may be suitable for some specific formulae of intumescent stocks.

Following curing, the cured intumescent stock 12 is removed from the sheet 20 and placed 26 in a grinder 28. The grinder 28 may include any suitable grinding device. Suitable grinding devices to grind the pre-cured intumescent stock 12 include ball-mill, roller mill, jet mill, impact grinders, and the like. In addition, the grinder 28 may include an extrusion device. For example, the cured intumescent stock 12 may be placed in a hopper of the extrusion device and forced through a relatively small orifice via the action of a rotating feed screw. In so doing, sheer forces are generated that reduce the particle size of the cured intumescent stock 12. A polymer melt material may be added to the cured intumescent stock before, during, or after extrusion. In a particular example, a polymer melt material is added to the cured intumescent stock 12 before extrusion and this combination may be extruded into a mold to form an item that incorporates the cured intumescent stock 12.

The ground, cured intumescent stock 12 may be placed 30 in a mixer 32. In addition, a binder 34 may be placed 36 in the mixer 32. The ground, cured intumescent stock 12 and the binder 34 are mixed 38 in the mixer 32 to generate an intumescent solution 40. The mixer 32 may include any suitable bladed, paddled, or roller mixer operable to disperse the ground, cured intumescent stock 12 into the binder 34. The binder 34 may include any suitable binding, carrying, adhesive, or coating agent. In a particular example, the binder 34 includes an epoxy resin. In other examples, the binder 34 includes one or more of acrylic, urethane, nylon, polycarbonate, and the like.

The intumescent solution 40 may be placed 42 in a dispenser 44 and applied 46 to an item 48 to form a coating 50 on the item 48. The dispenser 44 includes any suitable device or process to apply 46 the intumescent solution 40 to the item 48 in a relatively thin layer or film. Examples of suitable dispensers include paint sprayers, brushes, rollers, and the like. A suitable process may include dipping the item 48 into the intumescent solution 40.

The item 48 includes any suitable product or part that would benefit from reduced flammability or any suitable product or part that may be placed in an environment that would benefit from a reduction in flammability and/or reduced fire propagation. In particular, examples of items include buildings and building interiors, vehicles and vehicle interiors, furniture, wall coverings, and the like. In a specific example, any item within an interior of an airframe may be suitable for coating.

In addition to coating the item 48, the intumescent solution 40 may be utilized to fabricate the item 48. For example, the intumescent solution 40 may include an epoxy binder suitable for fabricating. Used alone or in combination with a reinforcement (e.g., fiberglass and the like), items such as, for example, chairs, desks, wall coverings, floor panels, and the like may be fabricated. In another example, a melt polymer may be added to the cured intumescent stock 12 and extruded into a mold to form the item 48.

Figure 2:
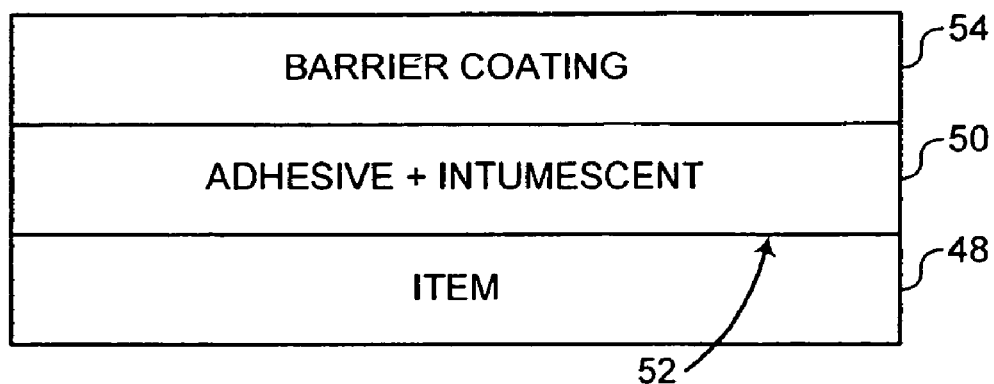
FIG. 2 is a simplified cross-sectional view of an item coated in an intumescent solution in accordance with an embodiment of the invention.

FIG. 2 is a simplified cross-sectional view of the item 48 coated in the intumescent solution 40 in accordance with an embodiment of the invention. As shown in FIG. 2, the item 48 includes a substrate 52 to provide a surface conducive to adhesion of the intumescent solution 40. For example, the substrate 52 may be cleaned prior to application 46 of the intumescent solution 40. In another example, the substrate 52 may be chemically and/or physically etched to provide a conducive bonding surface for the intumescent solution 40. In yet another example, a suitable adhesive promoter, such as latex and the like, may be applied to the substrate to provide a conducive surface for adhesion of the intumescent solution 40.

In addition, a barrier coating 54 may be applied to the item 48. The barrier coating 54, if present, provides a protective layer to the coating 50. In a preferred form, the barrier coating 54 provides a moisture resistant layer to reduce exposure of the coating 50 to moisture such as humidity, condensation and the like. In a particular example, the barrier coating 54 may include a solvent-based coating or film.

In an embodiment, the coating 50 is allowed to dry or cure at room temperature for a suitable amount of time in order for any solvent to evaporate and/or the binder 34 to polymerize. Suitable drying or curing times include about 1, 2, 5, 10, or 30 minutes. Suitable temperatures range from about 65° F. (18° C.) to about 85° F. (30° C.). The coating 50 is optionally prepared for application of the barrier coating 54 by cleaning and/or physically or chemically etching the coating 50. The barrier coating 54 may be allowed to dry or cure for a similar amount of time and at a similar temperature.

Figure 3:
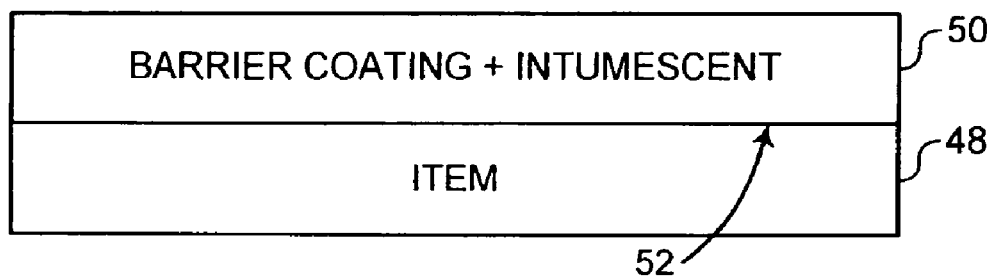
FIG. 3 is a simplified cross-sectional view of an item coated in an intumescent solution in accordance with another embodiment of the invention.

FIG. 3 is a simplified cross-sectional view of an item coated in an intumescent solution in accordance with another embodiment of the invention. As shown in FIG. 3, the coating 50 provides a barrier coating functionality. More particularly, the coating 50 may include an acrylic, epoxy and/or other such resin or plastic. In this manner, a single layer is configured to provide a fire retardant and moisture resistant capability. In a preferred form, the coating of FIG. 3 is allowed to dry or cure for approximately 2 minutes.

It is an advantage of embodiments of the present invention that the relatively short curing times reduce costs and improve productivity as compared to conventional fire retardant coating procedures. It is another advantage of embodiments of the present invention that the relatively low curing temperatures reduce costs and improve productivity as compared to conventional fire retardant coating procedures.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A fire-retardant coating material, comprising:
    an intumescent material, the intumescent material having been cured and powdered, the intumescent material comprising:
        a hydrocarbon comprising a plurality of alcohol groups;
        an acid source; and
        a blowing agent;
    a binder, wherein;
        the intumescent material is pre-cured and powdered prior to adding to the binder;
        the fire-retardant coating material dries at room temperature; and
    a barrier coating applied to the intumescent material.

2. The fire-retardant material according to claim 1, wherein the binder is a plastic resin.

3. The fire-retardant material according to claim 2, wherein the binder is an epoxy resin.

4. The fire-retardant material according to claim 1, wherein the hydrocarbon is a polyol compound.

5. The fire-retardant material according to claim 4, wherein the hydrocarbon is a epoxide-based compound.

6. The fire-retardant material according to claim 4, wherein the hydrocarbon is a melamine-based compound.

7. The fire-retardant material according to claim 1, wherein the acid source is a phosphate.

8. The fire-retardant material according to claim 1, wherein the barrier coating is solvent-based.

* * * * *

UNITED STATES PATENT AND TRADEMARK OFFICE
CERTIFICATE OF CORRECTION

PATENT NO. : 7,618,563 B2             Page 1 of 1
APPLICATION NO. : 11/252592
DATED : November 17, 2009
INVENTOR(S) : John N. Harris It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 952 days.

Signed and Sealed this

Twenty-sixth Day of October, 2010

David J. Kappos
*Director of the United States Patent and Trademark Office*